(12) United States Patent
Chu

(10) Patent No.: US 8,169,094 B2
(45) Date of Patent: May 1, 2012

(54) GENERATING SYSTEM USING SOLAR ENERGY AND WIND POWER

(76) Inventor: Yu-Lin Chu, Tainan (TW)

(*) Notice: Subject to any disclaimer, the term of this patent is extended or adjusted under 35 U.S.C. 154(b) by 444 days.

(21) Appl. No.: 12/546,028

(22) Filed: Aug. 24, 2009

(65) Prior Publication Data

US 2011/0043044 A1 Feb. 24, 2011

(51) Int. Cl.
*F03B 13/00* (2006.01)
*F03B 13/10* (2006.01)
*H02P 9/04* (2006.01)
*F03D 9/00* (2006.01)
*F01C 13/00* (2006.01)
*F01D 15/10* (2006.01)
*F02C 6/00* (2006.01)
*F02D 25/00* (2006.01)

(52) U.S. Cl. ............... 290/43; 290/4 R; 290/44; 290/54

(58) Field of Classification Search ............ 290/4 R, 290/43, 44, 54
See application file for complete search history.

(56) References Cited

U.S. PATENT DOCUMENTS

| | | | |
|---|---|---|---|
| 4,117,682 A * | 10/1978 | Smith | 60/641.8 |
| 4,172,766 A * | 10/1979 | Laing et al. | 202/173 |
| 4,200,904 A * | 4/1980 | Doan | 362/183 |
| 4,230,531 A * | 10/1980 | Fernandopulle | 202/180 |
| 4,363,703 A * | 12/1982 | ElDifrawi et al. | 203/10 |
| 4,433,248 A * | 2/1984 | Marks | 290/44 |
| 4,483,320 A * | 11/1984 | Wetzel et al. | 126/584 |
| 4,512,157 A * | 4/1985 | Weadock | 60/641.8 |
| 4,545,365 A * | 10/1985 | Wetzel, Jr. | 126/610 |
| 4,779,006 A * | 10/1988 | Wortham | 290/55 |
| 5,512,787 A * | 4/1996 | Dederick | 290/4 R |
| 5,608,268 A * | 3/1997 | Senanayake | 290/54 |
| 6,083,382 A * | 7/2000 | Bird | 210/96.2 |
| 7,453,167 B2 * | 11/2008 | Gilbert | 290/55 |
| D622,887 S * | 8/2010 | Lewis | D26/71 |
| 7,795,748 B2 * | 9/2010 | DeAngeles | 290/43 |
| 7,808,127 B2 * | 10/2010 | Teggatz et al. | 307/84 |
| 7,851,935 B2 * | 12/2010 | Tsao | 290/44 |
| 7,888,590 B2 * | 2/2011 | Niederer | 136/251 |
| 7,937,955 B2 * | 5/2011 | Tsao | 62/6 |
| 8,008,806 B2 * | 8/2011 | Day | 307/64 |
| 2006/0137348 A1 * | 6/2006 | Pas | 60/641.1 |
| 2008/0231119 A1 * | 9/2008 | Yeh | 307/65 |
| 2009/0140525 A1 * | 6/2009 | Deangeles | 290/54 |
| 2009/0315330 A1 * | 12/2009 | Dederick | 290/53 |
| 2010/0026100 A1 * | 2/2010 | Teggatz et al. | 307/82 |
| 2010/0076615 A1 * | 3/2010 | Daniel et al. | 700/293 |
| 2010/0107633 A1 * | 5/2010 | Tsao | 60/641.8 |
| 2010/0133820 A1 * | 6/2010 | Tsao | 290/44 |
| 2010/0170293 A1 * | 7/2010 | Tsarev et al. | 62/476 |

(Continued)

*Primary Examiner* — Pedro J Cuevas
(74) *Attorney, Agent, or Firm* — Alan Kamrath; Kamrath IP Lawfirm, PA

(57) ABSTRACT

A generating system includes a first generating device (1) and a second generating device (2). The first generating device includes a housing (11), a solar cell panel (12), a storage unit (13), a heat conduction layer (16), a heating chamber (14) and a plurality of water pipes (15). The second generating device includes an impeller (21), a propeller shaft (22) and a generator (23). Thus, the first generating device can receive the solar energy to produce an electric power, and the second generating device is driven by the wind power and the water power to generate an electrical energy so that the generating system can use the natural resources to produce an electrical energy at the day and the night so as to enhance the generating efficiency of the generating system.

20 Claims, 8 Drawing Sheets

U.S. PATENT DOCUMENTS

| | | | |
|---|---|---|---|
| 2010/0225117 A1* | 9/2010 | Deangeles | 290/54 |
| 2010/0258449 A1* | 10/2010 | Fielder | 205/628 |
| 2010/0259044 A1* | 10/2010 | Muchow | 290/43 |
| 2011/0080007 A1* | 4/2011 | Tsao | 290/4 R |
| 2011/0139299 A1* | 6/2011 | Dederick | 141/98 |
| 2011/0146751 A1* | 6/2011 | McGuire et al. | 136/245 |
| 2011/0187119 A1* | 8/2011 | McMaster | 290/55 |
| 2011/0193512 A1* | 8/2011 | Singhal et al. | 320/101 |
| 2011/0232630 A1* | 9/2011 | Tsao | 126/600 |
| 2011/0270682 A1* | 11/2011 | Valin | 705/14.64 |

* cited by examiner

GENERATING SYSTEM USING SOLAR ENERGY AND WIND POWER

BACKGROUND OF THE INVENTION

1. Field of the Invention

The present invention relates to a generating system and, more particularly, to a generating system that generates heat and electricity by using a solar energy.

2. Description of the Related Art

A conventional generating system comprises a first generating device and a second generating device. The first generating device includes a base, a solar cell panel mounted on the base to receive and convert the solar energy into an electric power and a storage unit mounted on the base to receive the electric power of the solar cell panel. The second generating device includes a windmill rotatably mounted on the base of the first generating device and a generator mounted on the base of the first generating device and connected to the windmill to receive a power transmitted by the windmill so as to generate an electrical energy. However, the windmill is disposed at a vertical state so that the windmill easily falls down due to a blast of wind. In addition, the conventional generating system has a complicated construction with many parts, thereby increasing the costs of fabrication. Further, the conventional generating system is assembled difficulty, thereby causing inconvenience in assembly of the generating system.

BRIEF SUMMARY OF THE INVENTION

In accordance with the present invention, there is provided a generating system, comprising a first generating device and a second generating device. The first generating device includes a housing, a solar cell panel mounted on an open upper end of the housing to receive a solar energy and to convert the solar energy into an electric power and a thermal energy, a storage unit connected to the solar cell panel to receive the electric power of the solar cell panel, a heat conduction layer mounted in the housing, a heating chamber formed in the housing and located between the solar cell panel and the heat conduction layer to receive the thermal energy of the solar cell panel, and a plurality of water pipes mounted in the heating chamber of the housing and contacting with the heat conduction layer. The second generating device includes an impeller rotatably mounted on the housing of the first generating device, a propeller shaft mounted on a central portion of the impeller to rotate in concert with the impeller and a generator connected to the propeller shaft to receive a power transmitted by the propeller shaft so as to generate an electrical energy.

The primary objective of the present invention is to provide a generating system using the solar energy, wind power and water power.

According to another objective of the present invention, the first generating device can receive the solar energy to produce an electric power, and the second generating device is driven by the wind power and the water power to generate an electrical energy so that the generating system can use the natural resources to produce an electrical energy at the day and the night so as to enhance the generating efficiency of the generating system.

According to a further objective of the present invention, the first generating device can receive the solar energy to produce a thermal energy that is used to heat the water in each of the water pipes so as to produce hot water for a household purpose.

According to a further objective of the present invention, the generating system is mounted on the roof of a building easily and conveniently, thereby decreasing the costs of assembly.

According to a further objective of the present invention, the impeller of the second generating device is disposed at a horizontal state so that the impeller of the second generating device will not fall down due to the wind.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
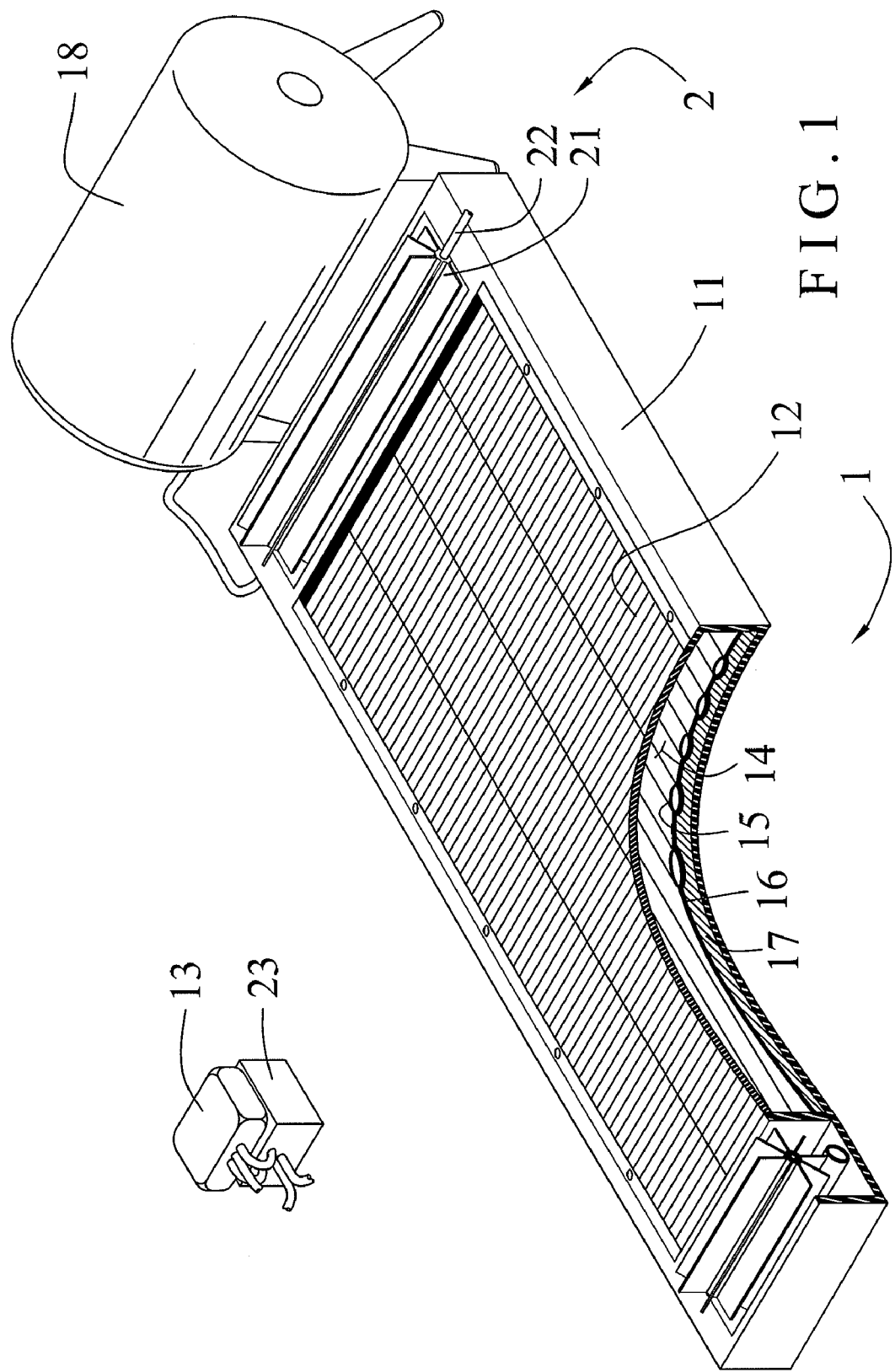
FIG. 1 is a partially perspective broken view of a generating system in accordance with the preferred embodiment of the present invention.
Figure 2:
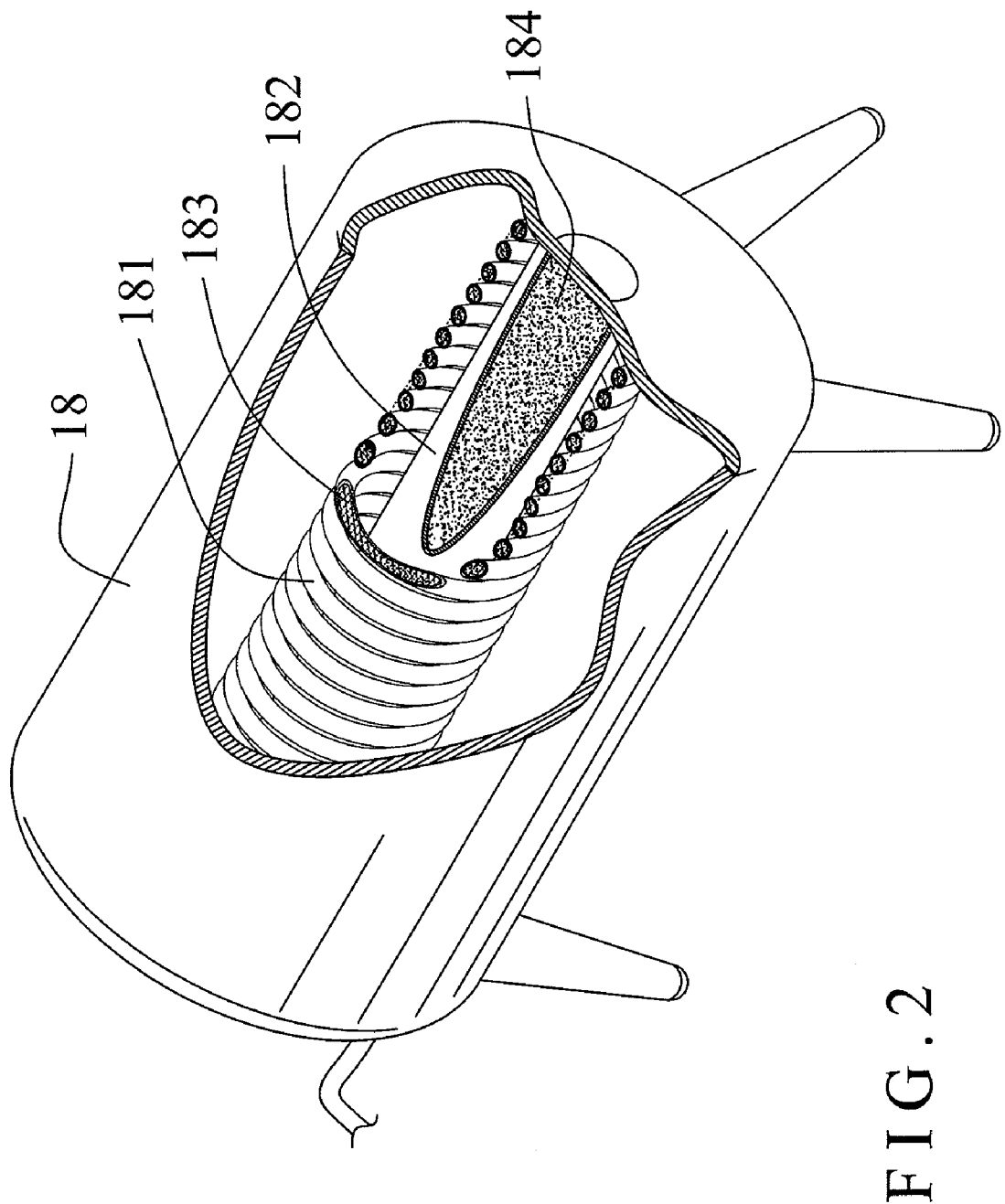
FIG. 2 is a partially perspective broken view of a water storage tank of the generating system as shown in FIG. 1.
Figure 3:
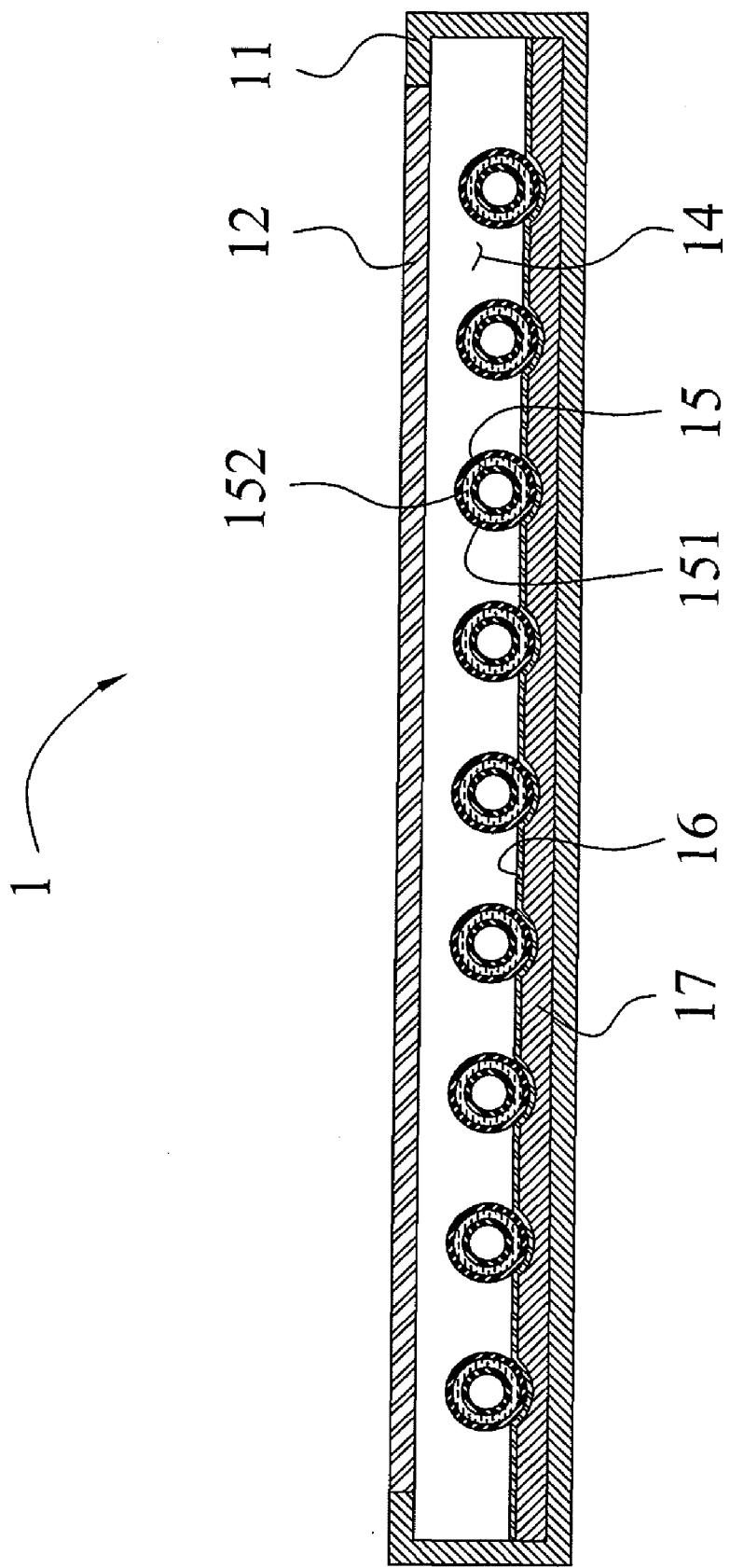
FIG. 3 is a side cross-sectional view of the generating system as shown in FIG. 1.
Figure 4:
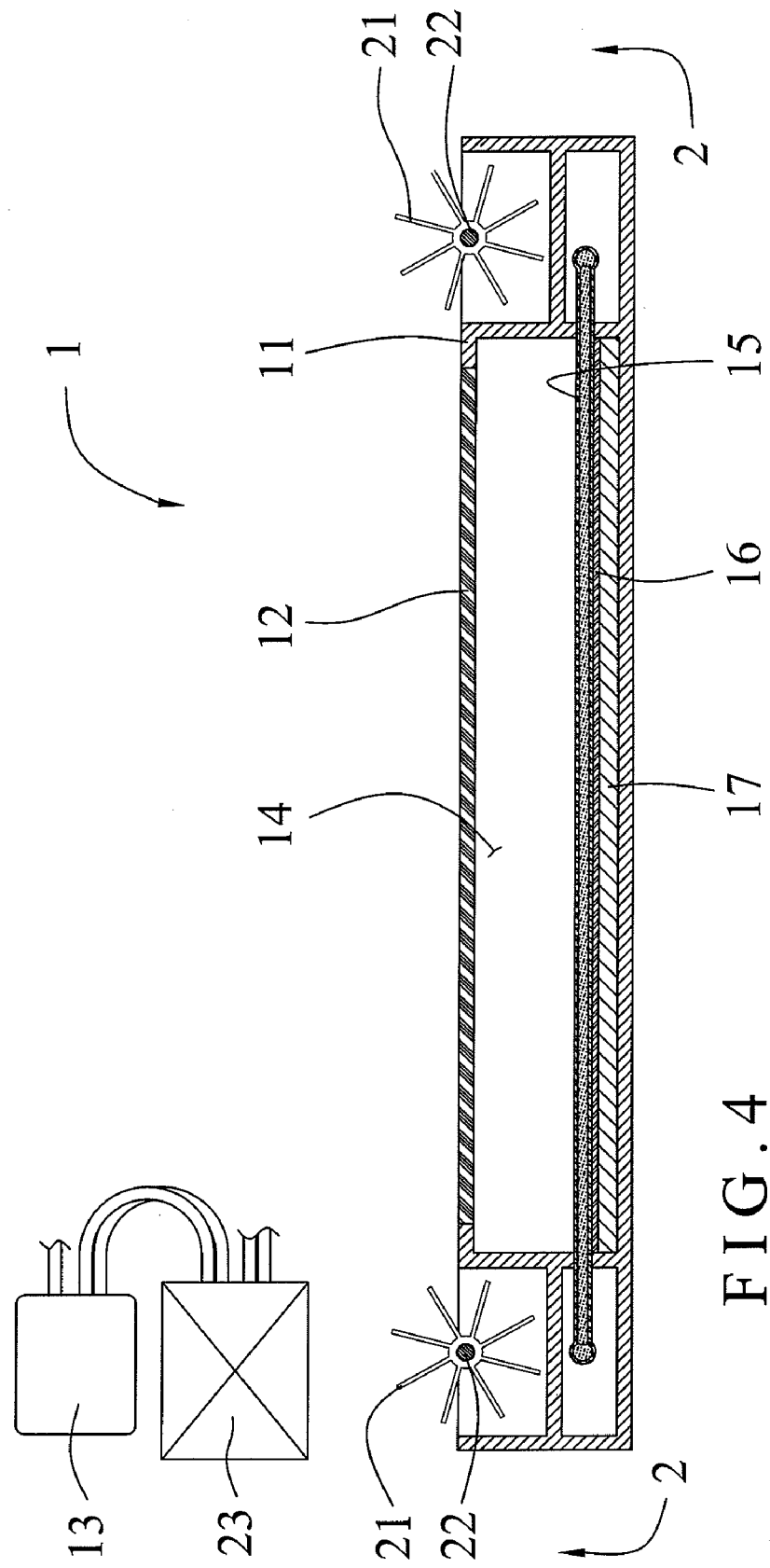
FIG. 4 is a front cross-sectional view of the generating system as shown in FIG. 1.

Referring to the drawings and initially to FIGS. 1-4, a generating system in accordance with the preferred embodiment of the present invention comprises a first generating device 1 and a second generating device 2.

The first generating device 1 includes a housing 11, a solar cell panel 12 mounted on an open upper end of the housing 11 to receive a solar energy and to convert the solar energy into an electric power and a thermal energy, a storage unit 13 connected to the solar cell panel 12 to receive the electric power of the solar cell panel 12, a heat conduction layer 16 mounted in the housing 11, a heating chamber 14 formed in the housing 11 and located between the solar cell panel 12 and the heat conduction layer 16 to receive the thermal energy of the solar cell panel 12, a plurality of water pipes 15 mounted in the heating chamber 14 of the housing 11 and contacting with the heat conduction layer 16, a plurality of warming pipes 151 mounted in the heating chamber 14 of the housing 11 and surrounding the water pipes 15 respectively, and a thermal insulation layer 17 mounted in and abutting a bottom of the housing 11.

The housing 11 has a substantially U-shaped cross-sectional profile. The heating chamber 14 is located between and sealed by the solar cell panel 12 and the housing 11. The heat conduction layer 16 is located between the water pipes 15 and the thermal insulation layer 17. The heat conduction layer 16 is made of metallic material having a greater heat conduction effect, such as a copper to enhance the heat conducting effect of the water pipes 15. The thermal insulation layer 17 is located between the heat conduction layer 16 and the bottom of the housing 11 to provide a thermal insulation effect and to prevent a heat loss. The storage unit 13 is located outside of the housing 11, and the electric power of the solar cell panel 12 is delivered to and stored in the storage unit 13. Each of the water pipes 15 is made of metallic material having a greater heat conduction effect, such as a copper. Each of the water pipes 15 is received in the heating chamber 14 and is located between the solar cell panel 12 and the heat conduction layer 16. Each of the warming pipes 151 has an inner portion containing a warming liquid 152. Thus, the water in each of the water pipes 15 is warmed by the warming liquid 152 in each of the warming pipes 151.

The first generating device 1 further includes a water storage tank 18 mounted on the housing 11 and connected to each of the water pipes 15 to form a water circulation between the water storage tank 18 and the water pipes 15, a heat storage tube 182 mounted in the water storage tank 18, and a helical warming tube 181 mounted in the water storage tank 18 and surrounding the heat storage tube 182. The water storage tank 18 is located outside of the housing 11 and has an inner portion containing water. The heat storage tube 182 has an inner portion containing a heat storage liquid 184, such as heavy oil, asphalt and the like so as to save the heat energy efficiently. The warming tube 181 has an inner portion containing a warming liquid 183, such as an oil and the like.

The second generating device 2 is mounted on two opposite sides of the housing 11 of the first generating device 1 and includes an impeller 21 rotatably mounted on the housing 11 of the first generating device 1, a propeller shaft 22 mounted on a central portion of the impeller 21 to rotate in concert with the impeller 21, and a generator 23 connected to the propeller shaft 22 to receive a power transmitted by the propeller shaft 22 so as to generate an electrical energy.

The impeller 21 of the second generating device 2 has a windmill shape and is disposed at a horizontal state. The impeller 21 of the second generating device 2 is located above each of the water pipes 15 of the first generating device 1. The impeller 21 of the second generating device 2 partially protrudes outwardly from the housing 11 of the first generating device 1 so that the impeller 21 of the second generating device 2 is rotated by the wind power or water power. The propeller shaft 22 of the second generating device 2 is disposed at a horizontal state and is located at a height the same as that of the solar cell panel 12 of the first generating device 1. The generator 23 of the second generating device 2 is located beside and connected to the storage unit 13 of the first generating device 1 to transmit the electrical energy to the storage unit 13 of the first generating device 1.

Figure 5:
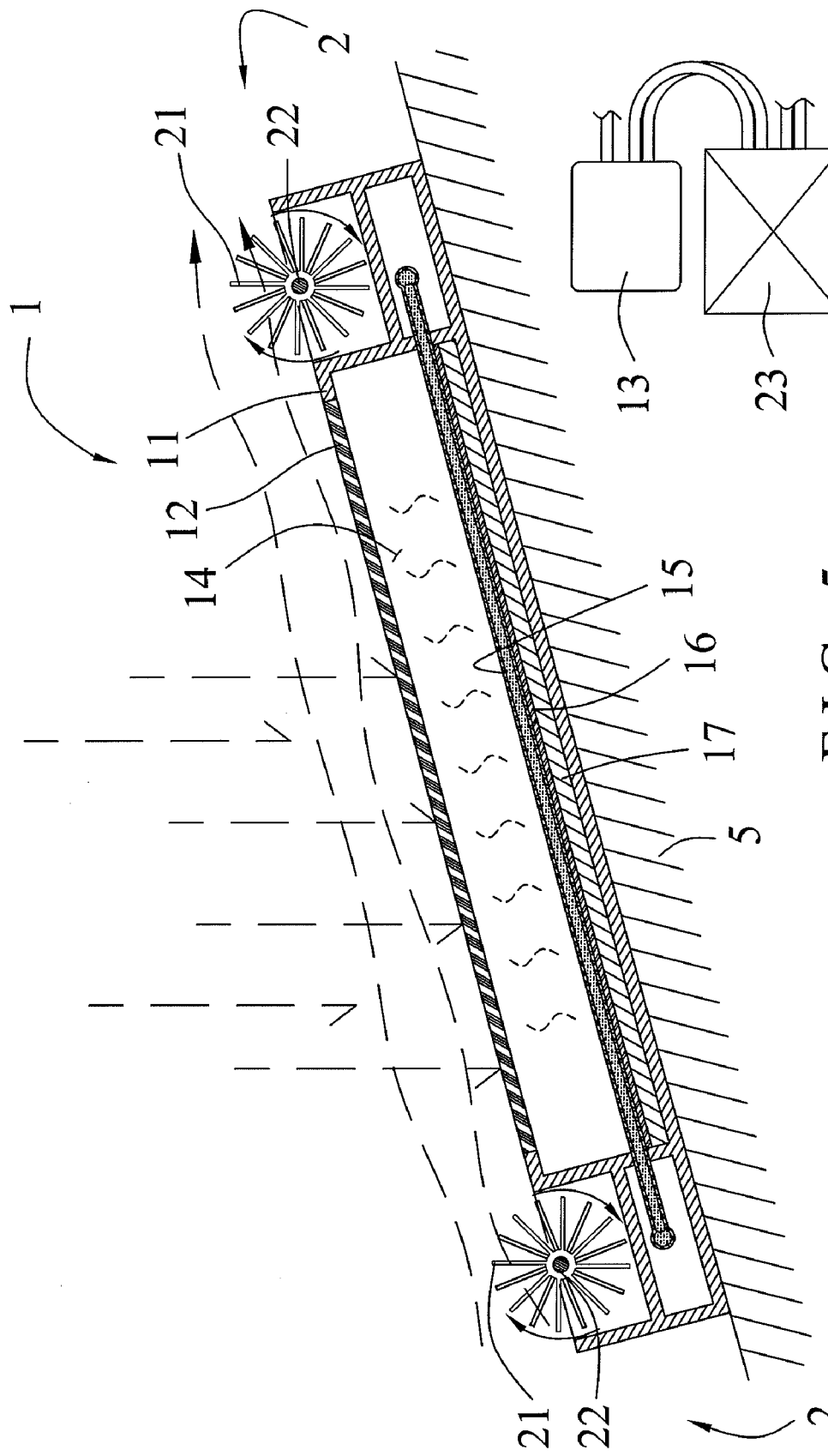
FIG. 5 is a schematic operational view of the generating system as shown in FIG. 4.
Figure 6:
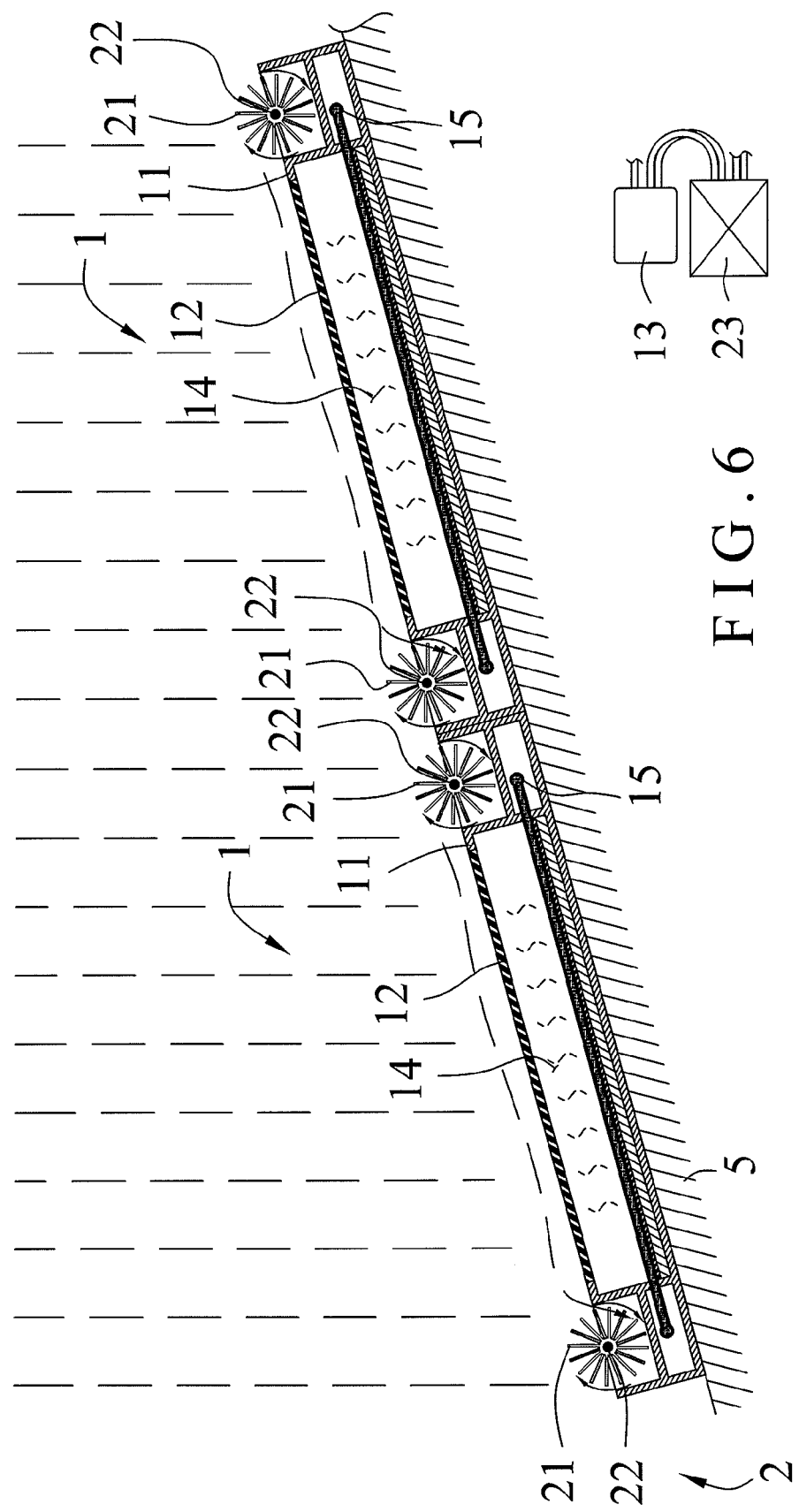
FIG. 6 is a schematic operational view of the generating system as shown in FIG. 4.

In operation, referring to FIGS. 5 and 6 with reference to FIGS. 1-4, the generating system is mounted on the top of a building 5 and is disposed at an inclined state. In such a manner, when the solar cell panel 12 of the first generating device 1 receives a solar energy, the solar cell panel 12 can convert the solar energy into an electric power and a thermal energy. Then, the electric power of the solar cell panel 12 is transmitted into and stored in the storage unit 13. Thus, the electric power stored in the storage unit 13 can be supplied to the building. In addition, when the solar cell panel 12 converts the solar energy into the electric power, the solar cell panel 12 will produce a thermal energy which is filled with the heating chamber 14 of the housing 11 to heat the water pipes 15 so as to heat the water flowing through the water pipes 15. At this time, the heat conduction layer 16 can enhance the heat conducting efficiency of each of the water pipes 15 by a heat conduction effect of the heat conduction layer 16. Preferably, the solar cell panel 12 is transparent to expose each of the water pipes 15 outwardly so that the solar light is directly projected onto each of the water pipes 15 to enhance the heating efficiency of each of the water pipes 15. In addition, when the water temperature in each of the water pipes 15 does not reach the required value, the electric power stored in the storage unit 13 can be supplied to heat the water in each of the water pipes 15. Thus, the first generating device 1 can receive the solar energy to produce an electric power that is transmitted into and stored in the storage unit 13 and a thermal energy that is used to heat the water in each of the water pipes 15.

Alternatively, when the wind blows on the top of the building 5, the impeller 21 of the second generating device 2 is rotated by the wind power as shown in FIG. 5 to produce a power to the propeller shaft 22, and the propeller shaft 22 transmits the power produced by rotation of the impeller 21 to the generator 23 so as to generate an electrical energy which is delivered to and stored in the storage unit 13 of the first generating device 1. Alternatively, when the rain drops onto the top of the building 5, the impeller 21 of the second generating device 2 is rotated by the water power as shown in FIG. 6 to produce a power to the propeller shaft 22, and the propeller shaft 22 transmits the power produced by rotation of the impeller 21 to the generator 23 so as to generate an electrical energy which is delivered to and stored in the storage unit 13 of the first generating device 1. Thus, the second generating device 2 can generate an electrical energy by the wind power and the water power when the solar energy disappears at the night. In addition, when the impeller 21 of the second generating device 2 is driven by the wind power or the water power, the impeller 21 of the second generating device 2 is rotated at the same direction, so that the impeller 21 of the second generating device 2 is rotated more rapidly when both of the wind power and the water power exist so as to enhance the generating efficiency.

Figure 7:
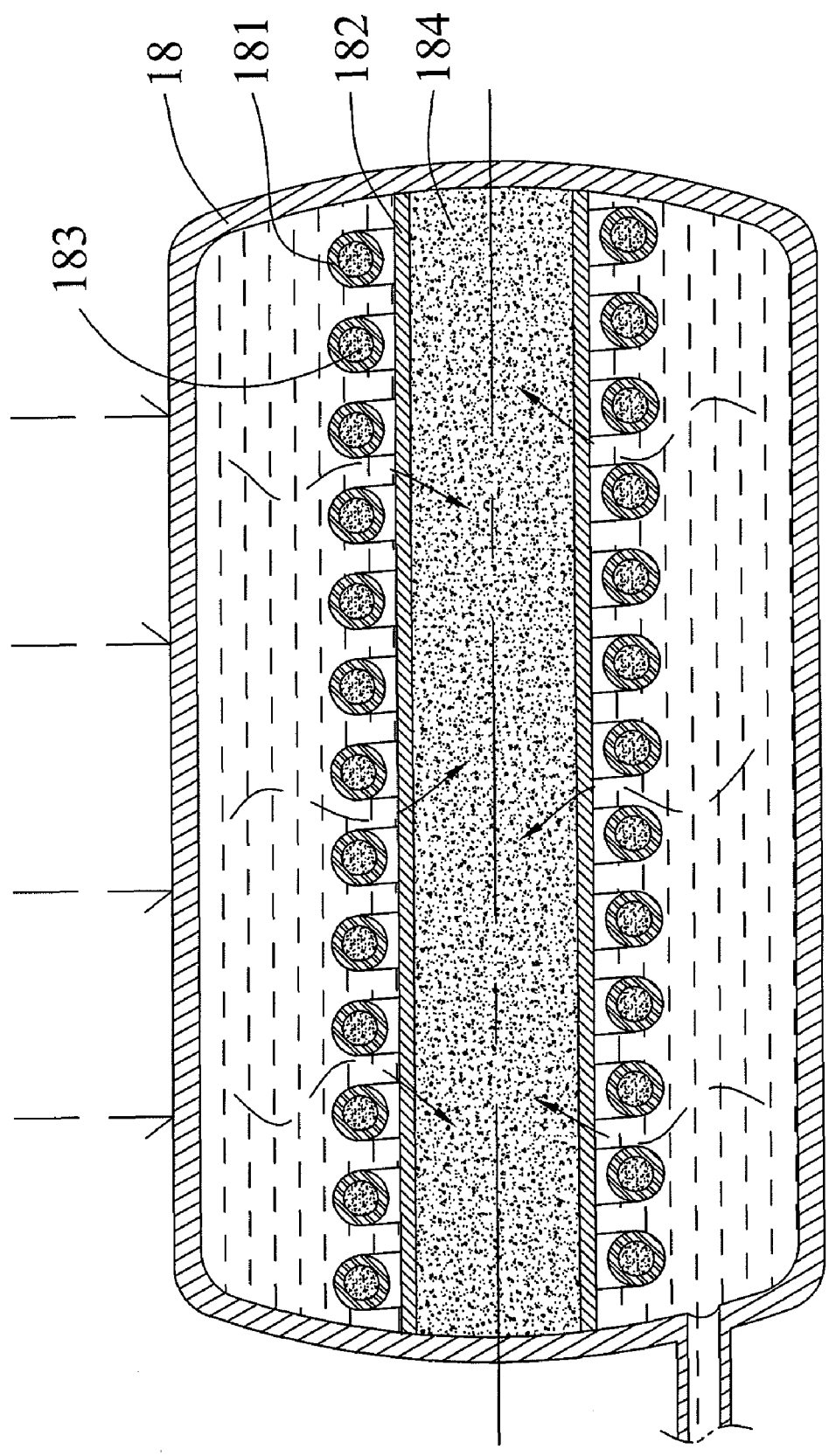
FIG. 7 is a front cross-sectional operational view of the water storage tank of the generating system as shown in FIG. 2.

As shown in FIG. 7, the heat energy from the sunshine is transmitted through the water storage tank 18 and the warming tube 181 into the heat storage tube 182 and is stored in the heat storage liquid 184. At the same time, the warming liquid 183 in the warming tube 181 can also absorb the heat energy and transmits the heat energy to heat the water in the water storage tank 18.

Figure 8:
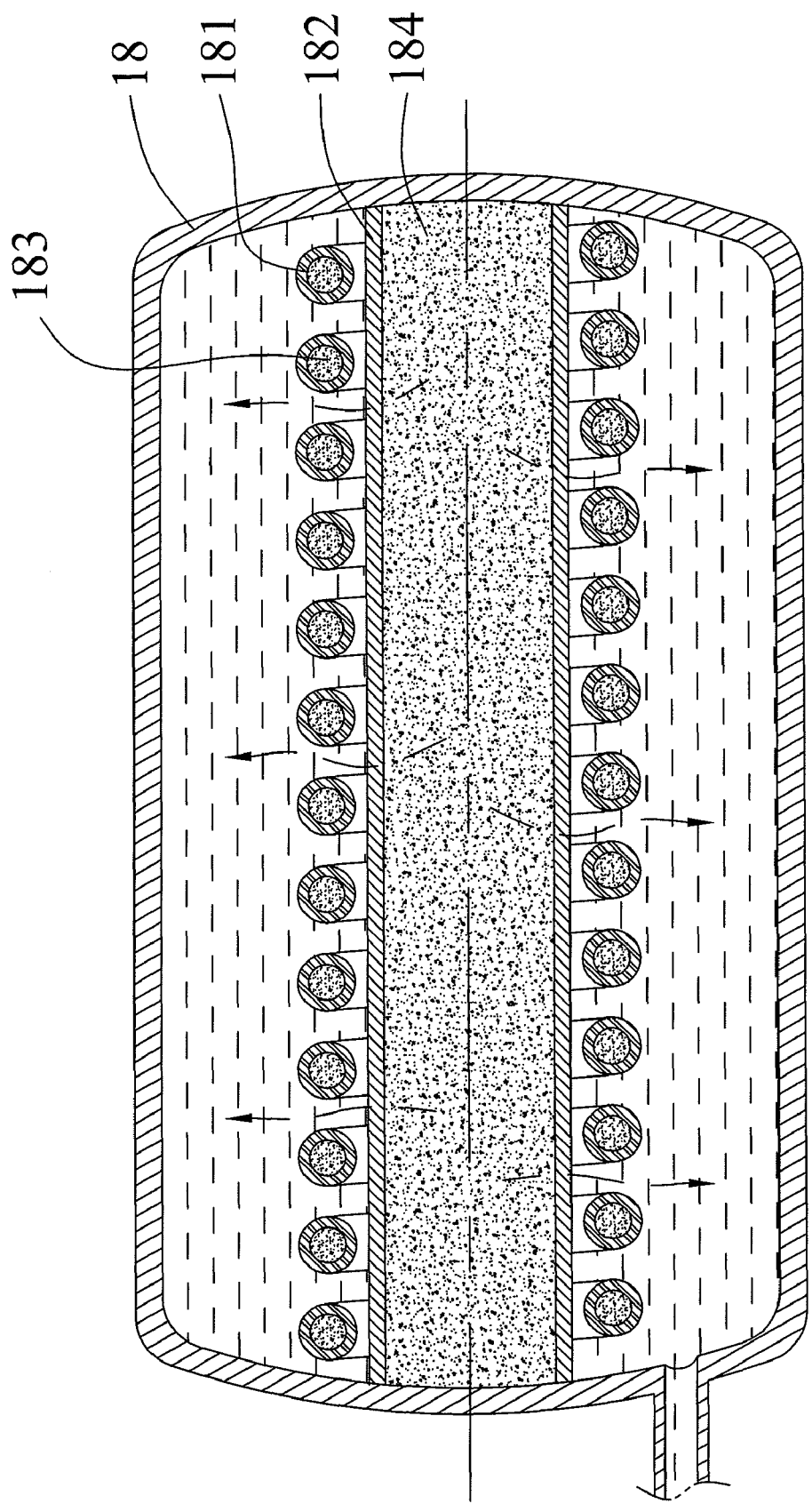
FIG. 8 is a front cross-sectional operational view of the water storage tank of the generating system as shown in FIG. 2.

As shown in FIG. 8, when the sunshine disappears, the heat energy stored in the heat storage liquid 184 of the heat storage tube 182 is transmitted to the water storage tank 18 to heat the water in the water storage tank 18.

Accordingly, the first generating device 1 can receive the solar energy to produce an electric power, and the second generating device 2 is driven by the wind power and the water power to generate an electrical energy so that the generating system can use the natural resources to produce an electrical energy at the day and the night so as to enhance the generating efficiency of the generating system. In addition, the first generating device 1 can receive the solar energy to produce a thermal energy that is used to heat the water in each of the water pipes 15 so as to produce hot water for a household purpose. Further, the generating system is mounted on the roof of a building 5 easily and conveniently, thereby decreasing the costs of assembly. Further, the impeller 21 of the second generating device 2 is disposed at a horizontal state so that the impeller 21 of the second generating device 2 will not fall down due to the wind.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A generating system, comprising: a first generating device (1) and a second generating device (2), wherein:
the first generating device includes:
a housing (11);
a solar cell panel (12) mounted on an open upper end of the housing to receive a solar energy and to convert the solar energy into an electric power and a thermal energy;
a storage unit (13) connected to the solar cell panel to receive the electric power of the solar cell panel;
a heat conduction layer (16) mounted in the housing;
a heating chamber (14) formed in the housing and located between the solar cell panel and the heat conduction layer to receive the thermal energy of the solar cell panel;
a plurality of water pipes (15) mounted in the heating chamber of the housing and contacting with the heat conduction layer;
the second generating device includes:
an impeller (21) rotatably mounted on the housing of the first generating device;
a propeller shaft (22) mounted on a central portion of the impeller to rotate in concert with the impeller;
a generator (23) connected to the propeller shaft to receive a power transmitted by the propeller shaft so as to generate an electrical energy.

2. The generating system of claim 1, wherein the first generating device further includes:
a plurality of warming pipes (151) mounted in the heating chamber of the housing and surrounding the water pipes respectively.

3. The generating system of claim 2, wherein each of the warming pipes has an inner portion containing a warming liquid (152).

4. The generating system of claim 1, wherein the first generating device further includes:
a thermal insulation layer (17) mounted in and abutting a bottom of the housing.

5. The generating system of claim 1, wherein the first generating device further includes:
a water storage tank (18) mounted on the housing and connected to each of the water pipes to form a water circulation between the water storage tank and the water pipes;
a heat storage tube (182) mounted in the water storage tank;
a warming tube (181) mounted in the water storage tank and surrounding the heat storage tube.

6. The generating system of claim 5, wherein the warming tube has a helical shape.

7. The generating system of claim 5, wherein
the heat storage tube has an inner portion containing a heat storage liquid (184);
the warming tube has an inner portion containing a warming liquid (183).

8. The generating system of claim 1, wherein
the impeller of the second generating device is disposed at a horizontal state;
the impeller of the second generating device partially protrudes outwardly from the housing of the first generating device.

9. The generating system of claim 1, wherein
the propeller shaft of the second generating device is disposed at a horizontal state;
the propeller shaft of the second generating device is located at a height the same as that of the solar cell panel of the first generating device.

10. The generating system of claim 1, wherein the second generating device is mounted on two opposite sides of the housing of the first generating device.

11. The generating system of claim 1, wherein the impeller of the second generating device has a windmill shape.

12. The generating system of claim 1, wherein the impeller of the second generating device is located above each of the water pipes of the first generating device.

13. The generating system of claim 1, wherein the generator of the second generating device is located beside and connected to the storage unit of the first generating device to transmit the electrical energy to the storage unit of the first generating device.

14. The generating system of claim 5, wherein the water storage tank is located outside of the housing.

15. The generating system of claim 1, wherein the heating chamber is located between and sealed by the solar cell panel and the housing.

16. The generating system of claim 4, wherein the heat conduction layer is located between the water pipes and the thermal insulation layer.

17. The generating system of claim 1, wherein the heat conduction layer is made of a copper.

18. The generating system of claim 4, wherein the thermal insulation layer is located between the heat conduction layer and the bottom of the housing.

19. The generating system of claim 1, wherein
the storage unit is located outside of the housing;
the electric power of the solar cell panel is delivered to and stored in the storage unit.

20. The generating system of claim 1, wherein each of the water pipes is received in the heating chamber and is located between the solar cell panel and the heat conduction layer.

\* \* \* \* \*